United States Patent [19]
Akema

[11] Patent Number: 4,896,852
[45] Date of Patent: Jan. 30, 1990

[54] BUNDLING BAND
[75] Inventor: Tsuyoshi Akema, Tokyo, Japan
[73] Assignee: Emhart Industries, Inc., Hartford, Conn.
[21] Appl. No.: 931,510
[22] Filed: Nov. 17, 1986
[30] Foreign Application Priority Data
  Nov. 21, 1985 [JP] Japan .................. 60-179566
[51] Int. Cl.$^4$ .............................................. F16L 3/08
[52] U.S. Cl. .................. 248/74.3; 24/16 PB; 248/909
[58] Field of Search ............ 248/74.3, 74.2, 73, 248/DIG. 9; 24/16 PB, 16 R, 30.5 P, 30.5 T; 292/218, 219, 220, 221, 222

[56] References Cited
U.S. PATENT DOCUMENTS

| 3,149,808 | 9/1964 | Wecksser | 24/16 PB X |
| 3,180,606 | 4/1965 | Sabin et al. | 248/73 X |
| 3,815,855 | 6/1974 | Appleton | 248/74.3 |
| 4,272,870 | 6/1981 | McCormick | 248/74.3 X |
| 4,318,528 | 3/1982 | Dobson | 248/DIG. 9 |
| 4,455,715 | 6/1984 | Matsui | 248/74.3 X |
| 4,473,524 | 9/1984 | Paradis | 24/16 PB X |
| 4,501,049 | 2/1985 | Adamson | 248/DIG. 9 X |
| 4,507,828 | 4/1985 | Furutsu | 248/74.3 X |
| 4,564,163 | 1/1986 | Barnett | 248/74.3 X |
| 4,572,466 | 2/1986 | Yamaguchi et al. | 248/74.3 X |
| 4,580,319 | 4/1986 | Paradis | 24/16 PB |

FOREIGN PATENT DOCUMENTS

| 0466689 | 7/1950 | Canada | 248/DIG. 9 |
| 0827505 | 2/1960 | United Kingdom | 248/DIG. 9 |

Primary Examiner—Ramon O. Ramirez
Attorney, Agent, or Firm—Spencer T. Smith

[57] ABSTRACT

A bundling band is provided comprising a strip-like band having a plurality of teeth and a holder portion with a hole in which the strip-like band is inserted and retained by a pawl contacting the teeth. The edge of the strip-like band is provided with a cutout of sufficient depth such that twisting of the band is effective to separate the undesired portion of the band from a bundle of wires or the like being bound by the band.

5 Claims, 3 Drawing Sheets

BUNDLING BAND

BACKGROUND OF THE INVENTION

The present invention relates to a bundling band for bundling elongated articles such as electric wires, wire harnesses, or the like.

Bundling bands are known having a strip-like band portion and a holder portion provided at one end of the band portion in order to bind elongated articles such as electric wires or wire harnesses. The holder portion is formed with a hole through which a free end of the band portion passes so that a loop is formed by the band portion passing through the hole to bind the elongated articles. The holder portion is provided with means to engage with the band portion for preventing the loop from loosening after hundling. This type of band is convenient in that it can bundle elongated articles by merely passing the free end of the band portion through the hole in the holder portion, and pulling it.

Although the above described bundling band is convenient, as mentioned above, its band portion is made long so as to allow a wide range of bundle diameters of electric wires or the like to be bound. Accordingly, when a bundle is small, it is inconvenient to the user in that an unnecessary long portion of the band portion must be cut off by a tool, such as a nipper.

Therefore, the present invention aims to provide a bundling band in which an unnecessary portion can be cut off easily without using a tool.

SUMMARY OF THE INVENTION

In order to accomplish the object as described above, according to the present invention, there is provided a bundling band having a strip-like band portion and a holder portion provided at one end of the band portion in order to bundle elongated articles such as electric wires or wire harnesses. The holder portion is formed with a hole through which a free end of the band portion passes so that a loop which is formed by the band portion passing through the hole is effective to bind the elongated articles. The holder portion is provided with means engageable with the band portion for preventing the loop from loosening after bundling. The present invention is characterized in that a side of the band portion is provided with a cutout of sufficient depth to be cut off by twisting the band portion. Accordingly, an unnecessary band portion can be cut off without using a tool such as a nipper, so as to enhance the operational efficiency of the bundling band.

BRIEF DESCRIPTION OF THE DRAWING

Reference should now be made to the accompanying drawing wherein.

DESCRIPTION OF THE PREFERRED EMBODIMENT

Figure 1A:
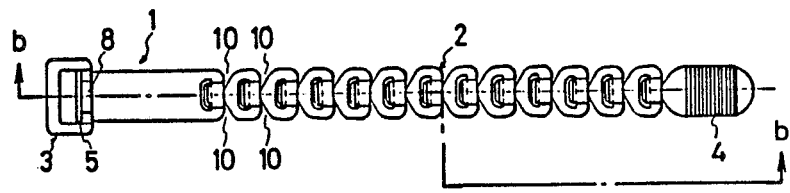
FIG. 1(a) is a plan view showing an embodiment of a bundling band constructed in accordance with the teachings of the present invention.
Figure 1B:
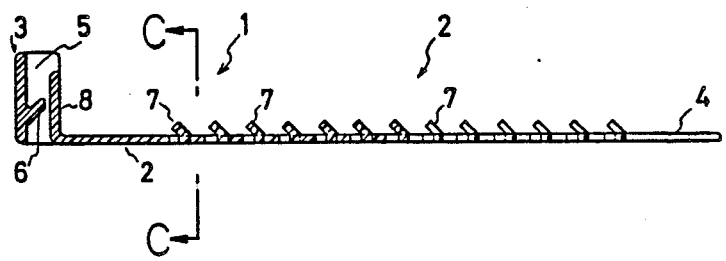
FIG. 1(b) is a sectional view taken along the lines (b)—(b) of FIG. 1(a)
Figure 1C:
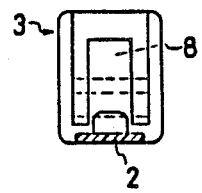
FIG. 1(c) is a sectional view taken along the lines (c)—(c) of FIG. 1(b)

The present invention will now be described further by way of embodiments, and referring to the accompanying drawings. FIGS. 1(a) through (c) show one embodiment of a bundling band constructed according to the teachings of the present invention. In those Figures a bundling band 1 comprises a strip-like band portion 2 and a holder portion 3 provided at one end of the band portion 2. The band 1 is made preferably of plastic, molded as one piece, and the band portion 2 is formed into a flat and strip-like configuration. The holder portion 3 is formed with a hole 5 through which a free end 4 of the band portion 2 passes so that wire harnesses or the like can be bundled in a loop formed by the band portion, when the free end 4 passes through the hole 5. So that the loop should not loosen after bundling, an engagement pawl 6 extends toward the inner side of the hole. It is preferable that a plurality of engagement teeth 7 are spaced apart from each other in the band portion 2, each of the teeth being associated with the engagement pawl 6. Instead of the engagement teeth 7, raised portions, openings or the like can serve to prevent the loop from loosening. It is also preferable that the holder portion 3 is formed as a tube extending perpendicular to the band portion 2 as illustrated. By so doing, the band can be handled easily. Further, it is preferred that a wall 8 facing the engagement pawl 6 of the holder portion 3 can be bent outwardly so that the engagement of the engagement pawl 6 with an engagement tooth 7 can be released by bending the wall to remove the band.

According to the present invention, a side edge of the band portion 2 of the bundling band 1, constructed as described above, is formed with cutouts 10 which are deep enough to be cut off by twisting the band portion 2 (namely, by rotating it about the longitudinal axis). As shown in FIG. 1(a) in particular, the cutouts 10 are preferably formed symmetrically in pairs on both side edges of the band portion. It, however, is possible that they be formed only on one of the side edges. Preferably, a number of the cutouts 10 are provided with predetermined spaces longitudinally in the band portion 2 so that the length to cut off can be chosen as desired.

Figure 2A:
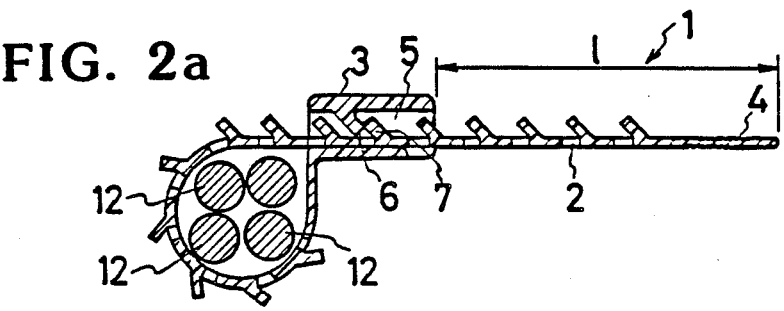
FIGS. 2(a), 2(b) and 2(c) are views showing the structure of FIGS. 1(a), 1(b) and 1(c) in use.
Figure 2B:
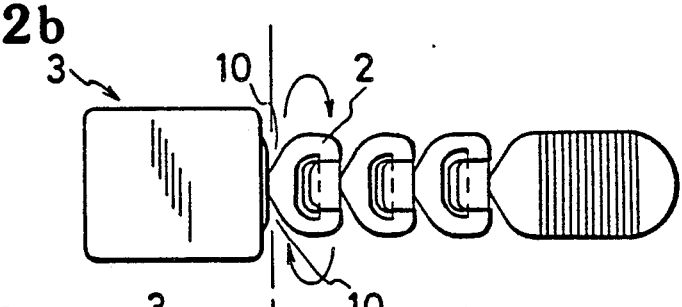
Figure 2C:
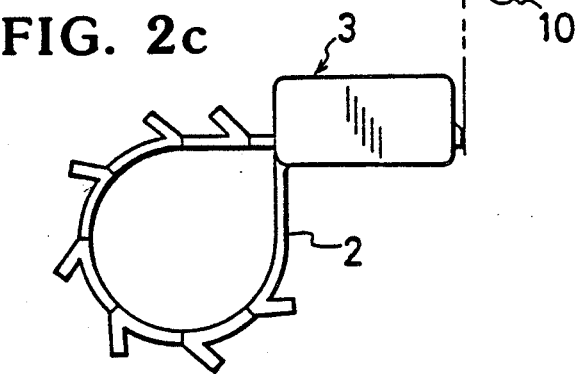

FIGS. 2(a) through (c) show the bundling band 1 in use. In FIG. 2(a), a plurality of elongated articles such as wire harnesses 12 are bundled in a loop formed by passing the free end 4 of the band portion 2 of the bundling band 1 through the hole 5 of the holder portion 3, and are tightly bound by strongly pulling the free end. The engagement pawl 6 of the holder portion 3 comes into engagement with the engagement teeth 7 of the band portion 2 so as to prevent the loop from loosening. In FIG. 2(a), a portion having a length of the band portion 2 extending out of the holder portion 3 becomes an unnecessary portion. Then, the band portion 2 is twisted at the cutouts 10, 10 as shown in FIG. 2(b), and the band portion 2 can be easily cut off at those cutouts twisted. That is to say, it can be cut off easily by hand without requiring any tool. The band presents a good appearance without any unnecessary portion, as shown in FIG. 2(c).

Figure 3A:
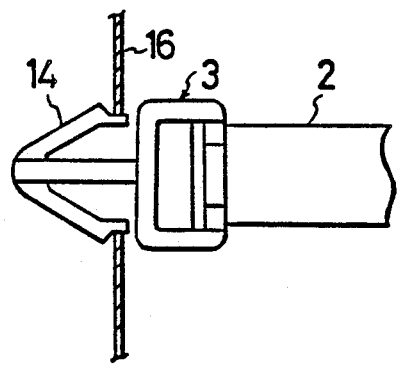
FIG. 3(a) is a plan view of an alternate form of the invention.
Figure 3B:
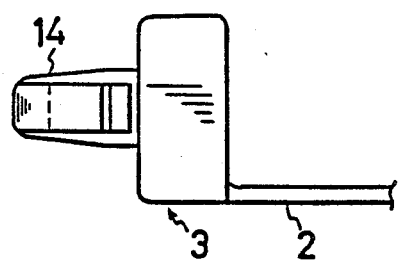
FIG. 3(b) is a partial side view showing the structure of FIG. 3(a)
Figure 4A:
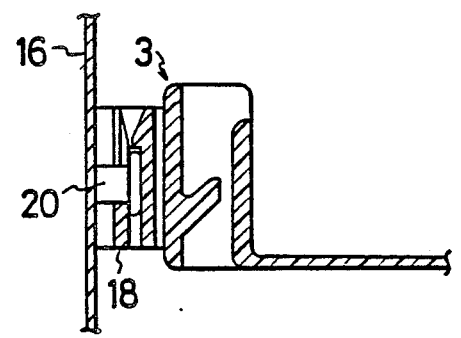
FIG. 4(a) is a sectional view showing another form of the invention.
Figure 4B:
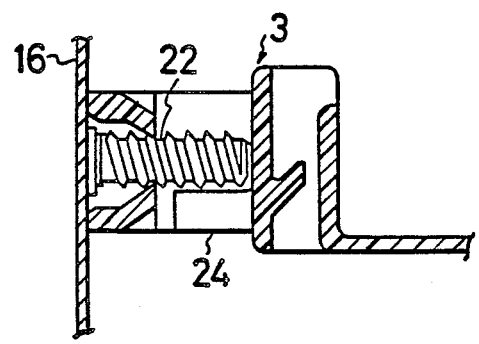
FIG. 4(b) is a sectional view showing yet another embodiment of the invention.

FIG. 3(a) and (b) show another embodiment of a bundling band according to the present invention. In this embodiment, an anchor leg 14 is formed on a side surface of the holder portion 3. By forming the anchor leg as shown, the bundling band can be fixed to a fitting hole in a panel 16 for holding a bundled body or the like. FIGS. 4(a) and (b) show still other embodiments. In a band shown in FIG. 4(a), a side surface of the holder portion 3 is formed with an engagement portion 18 to engage with a T-stud. The band is fixed to a T-stud 20 fixedly secured to the panel 16 by means of the engagement portion 18. In a band shown in FIG. 4(b), a side surface of the holder portion 3 is formed with an engagement portion 24 to engage with a threaded stud 22.

By providing structure in accordance with the present invention, as described above, cutouts are provided in the band portion, an unnecessary portion of the band portion can be cut off easily without using a tool like a nipper or pliers, and thus the operational efficiency of the bundling band is enhanced.

What is claimed is:

1. A bundling band having a strip-like band portion and a holder portion provided at one end of the band portion in order to bind elongated articles such as electric wires or wire harnesses, said holder portion being formed with a hole through which a free end of the band portion passes so that a loop is formed by the band portion passing through the hole to bundle the elongated articles, the holder portion being provided with means to engage with the band portion for preventing the loop from loosening after bundling, characterized in that the side edges of the band portion are provided with cutouts having a depth sufficient to be cut off by twisting the band portion, said cutouts being formed symmetrically on both side edges of the band portion, and a plurality of cutouts in pairs are formed from one end of the band portion toward the other end with predetermined spaces between them.

2. The bundling band according to claim 1 wherein the holder portion comprises a tube extending perpendicular to the band portion.

3. The bundling band according to claim 2 wherein an anchor leg is formed on a side surface of the tubular holder portion.

4. The bundling band according to claim 2 wherein an engagement portion to engage with a T-stud is formed on a side surface of the tubular holder portion.

5. The bundling band according to claim 2 wherein an engagement portion to engage with a threaded stud is formed on a side surface of the tubular holder portion.

* * * * *